United States Patent [19]

Kani

[11] Patent Number: 4,688,111

[45] Date of Patent: Aug. 18, 1987

[54] TIME BASE CORRECTOR

[75] Inventor: Tetsuo Kani, Kanagawa, Japan

[73] Assignee: Sony Corporation, Tokyo, Japan

[21] Appl. No.: 777,733

[22] Filed: Sep. 19, 1985

[30] Foreign Application Priority Data

Sep. 27, 1984 [JP] Japan .................................. 59-202221

[51] Int. Cl.$^4$ .......................... H04N 5/94; H04N 5/95
[52] U.S. Cl. ................................... 360/36.2; 360/38.1;
358/339; 358/336; 358/160
[58] Field of Search ..................... 360/36.2, 36.1, 38.1;
358/339, 337, 336, 160

[56] References Cited

U.S. PATENT DOCUMENTS

| | | | |
|---|---|---|---|
| 4,134,131 | 1/1979 | Hopkins | 358/339 |
| 4,215,376 | 7/1980 | Mach | 360/36.2 |
| 4,389,678 | 6/1983 | Mizukami | 360/36.2 |
| 4,626,912 | 12/1986 | Wilkinson | 358/339 |

Primary Examiner—Alan Faber
Attorney, Agent, or Firm—Lewis H. Eslinger; Alvin Sinderbrand

[57] ABSTRACT

In a time base corrector incorporated in a VTR, if a time during which a vertical synchronizing signal is written in a memory unit exceeds one horizontal period segment, the video signal stored at the first address of the memory unit is dropped out during data reading operation. To overcome the above problem, a write address designation signal is initially latched in response to a vertical synchronizing signal; a predetermined number is subtracted from the latched address number; the subtracted address number is loaded in a counter in response to a reference vertical synchronizing signal and is incremented in response to a reference horizontal synchronizing signal in order to shift the read start address, thus preventing video signals stored in the memory unit from being dropped off.

4 Claims, 5 Drawing Figures

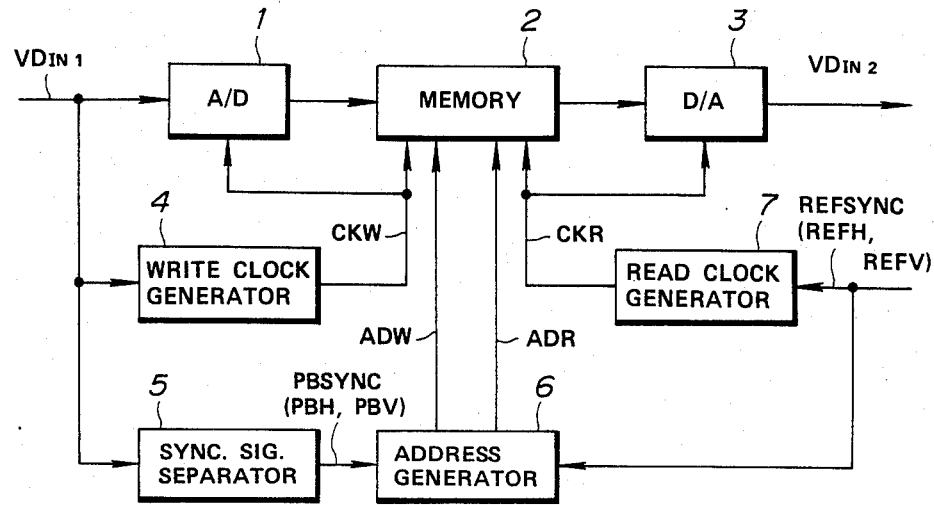
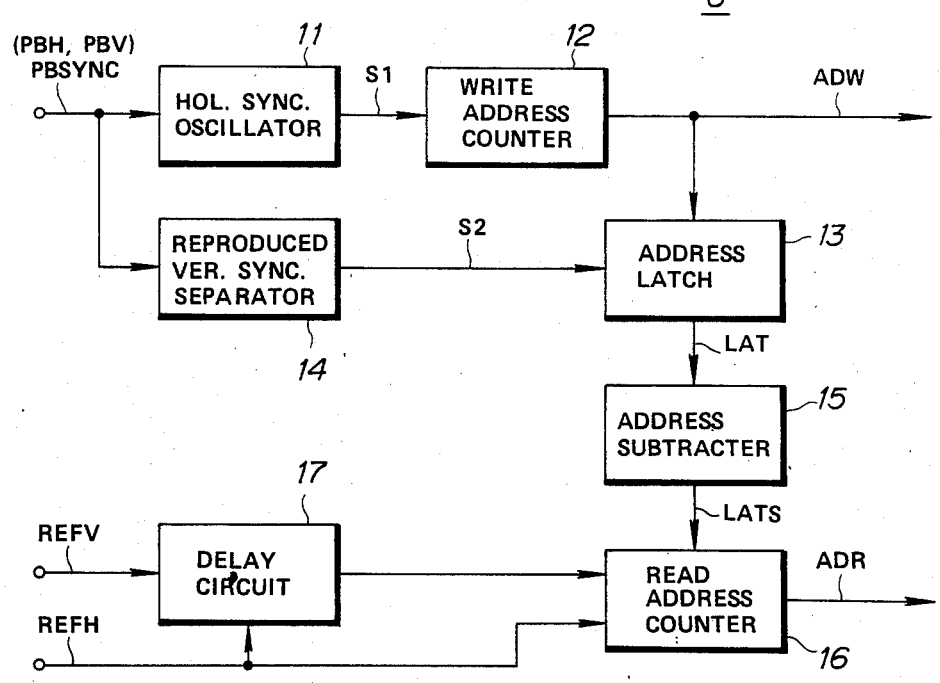

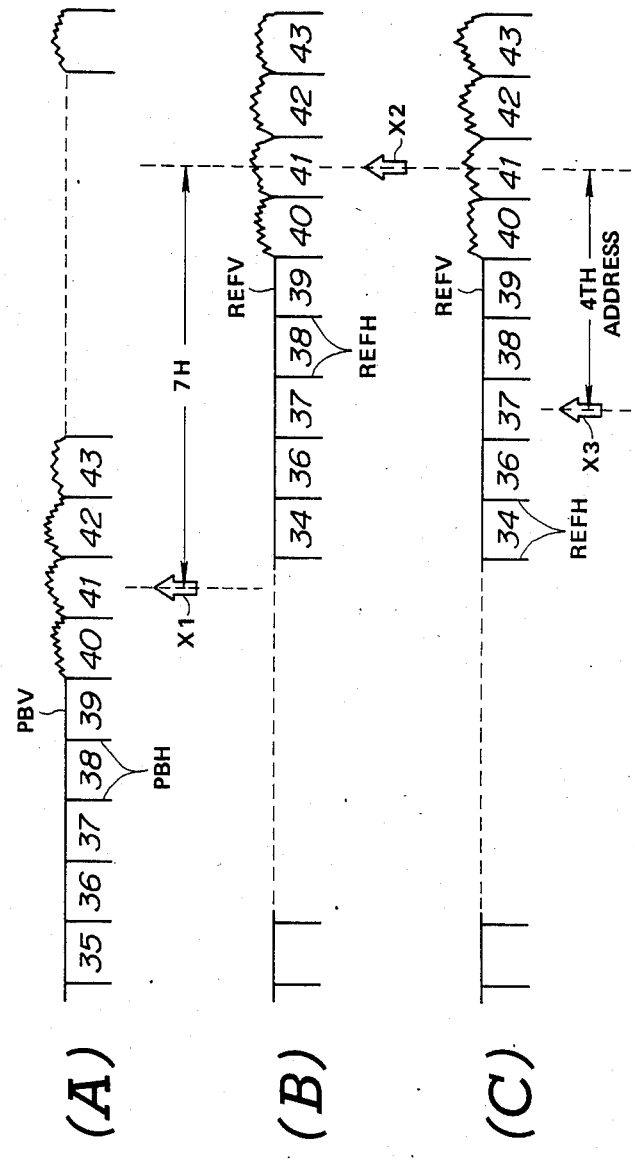

TIME BASE CORRECTOR

BACKGROUND OF THE INVENTION

1. Field of the Invention

The present invention relates generally to a time base corrector, and more specifically to an address generator incorporated in a time base corrector for a video tape recorder. The address generator serves to generate a write address designation signal to a memory unit in response to a reproduced horizontal synchronizing signal including time base fluctuations and also to generate a read address designation signal to the memory unit in response to a reference synchronizing signal having a stable period.

2. Description of the Prior Art

In a video tape recorder, reproduced video signals usually include jitters (time base fluctuations). To eliminate the jitters, a time base corrector having a digital memroy unit is incorporated in the video tape recorder. A reproduced video signal is sequentially written in the memory unit in digital fashion in response to a write clock signal generated on the basis of a burst signal included in the reproduced video signal and then sequentially read from the memory unit in response to a read clock signal generated on the basis of a reference signal having a stable period.

In writing the reproduced video signal in the memory unit, a write address designation signal is outputted from an address generator to the memory unit for designating the first address for each scanning line in response to a reproduced synchronizing signal having time base fluctuations; while in reading the reproduced video signal from the memory unit, a read address designation signal is outputted from the address generator to the memory unit for designating the first address for each scanning line in response to a reference synchronizing signal having a stable period.

On the other hand, in the video tape recorder, the so-called vertical synchronization method is usually adopted for reading video data classified according to each field from the memory unit. To implement the vertical synchronization method, an address at which a reproduced vertical synchronizing signal is written should be latched.

In the prior-art time base corrector, however, there exists a problem in that the video signal stored at the first address of the memory unit is sometimes omitted or dropped off. This is because a data processing time interval is necessary for writing the vertical synchronizing signal in the memory unit and simultaneously for latching the corresponding address in an address counter. In case the above latch processing time exceeds the one horizontal period segment, the read-start address is inevitably shifted to the next one, thus resulting in drop-out of video data stored in the memory unit and therefore resulting in deterioration in reproducing performance of video signals.

The above problem caused in the prior-art time base corrector for a video tape recorder will be described in further detail hereinafter with reference to the attached drawings under DETAILED DESCRIPTION OF THE PREFERRED EMBODIMENT.

SUMMARY OF THE INVENTION

With these problems in mind, therefore, it is the primary object of the present invention to provide a time base corrector for video tape recorders which can prevent the reproduced video signals from being omitted or dropped off when video signals are read from a memory unit for implementing time base correction.

To achieve the above-mentioned object, the time base corrector according to the present invention comprises: (a) a write clock generator for generating a write clock signal CKW having time base fluctuations included in the reproduced video signal, (b) a memory unit for storing the reproduced video signal $VD_{IN1}$ in response to the write clock signal CKW, (c) a synchronizing signal separator for separating a horizontal synchronizing signal PBH and a vertical synchronizing signal PBV from the reproduced video signal $VD_{IN1}$, (d) a read clock generator for generating a read clock signal CKR having no time base fluctuations in response to a reference synchronizing signal REFSYNC including two reference horizontal and vertical synchronizing signals REFH and REFV, and (c) an address generator including: (1) means for sequentially incrementing a write address designation signal ADW in response to the horizontal synchronizing signal PBH, (2) means for latching the incremented write address designation signal ADW in response to the vertical synchronizing signal PBV, (3) means for subtracting a predetermined number of addresses from the address corresponding to the latched write address designation signal LAT, and (4) means for loading the subtracted number of addresses in response to a reference vertical synchronizing signal REFV and for sequentially incrementing the loaded number of addresses in response to a reference horizontal synchronizing signal REFH to output a read address designation signal ADR to the memory unit.

In the time base corrector thus constructed, since a predetermined number of addresses is subtracted from the number of addresses which is latched by the address latching means, even when the latch operation time interval exceeds the vertical synchronization period segment in the address latching means, it is possible to start to read video signals beginning from the read-start address prior to that at which a video signal for the first scanning line is stored, thus it being possible to read stored video data from the memory means without dropping out the video signal.

BRIEF DESCRIPTION OF THE DRAWINGS

The features and advantages of the time base corrector according to the present invention over the prior-art corrector will be more clearly appreciated from the following description of the preferred embodiment of the invention taken in conjunction with the accompanying drawings in which like reference numerals or symbols designate the same or similar elements or sections throughout the figures thereof and in which:

FIG. 1 is a schematic block diagram showing a basic configuration of the time base corrector to which an embodiment of the essential section (address generator) according to the present invention is applied;

FIG. 2 is a schematic block diagram showing the embodiment of the address generator according to the present invention; and FIGS. 3(A), (B) and (C) are graphical representations showing signal waveforms of video signals classified according to each horizontal segment for assistance in explaining the operation of the time base corrector according to the present invention, in which FIGS. 3(A) and (B) show the operation of the prior-art time base corrector and FIG. 3(C) shows the operation of the time base corrector according to the present invention.

DETAILED DESCRIPTION OF THE PREFERRED EMBODIMENTS

To facilitate understanding of the present invention, a brief reference will be made to the operation of the conventional time base corrector with reference to the attached drawings.

In a video tape recorder (VTR), a video signal reproduced from a tape usually includes jitters. The jitters are slight and are high-speed waveform fluctuations caused by mechanical disturbance or by change in power supply voltage or in mechanical component characteristics, resulting in phase fluctuations, asynchronizations, interference between signals. To eliminate the jitters, a time base corrector including a digital memory unit as shown in FIG. 1 is usually incorporated with a tape recorder.

In FIG. 1, a reproduced video signal $VD_{IN1}$ is converted from analog to digital through an analog-to-digital converter 1 and then written into a memory unit 2 in sequence in response to a write clock signal CKW included in the reproduced video signal $VD_{IN1}$. The video data stored in the memory unit 2 are read in sequence in response to a read clock signal CKR having a stable predetermined period on the basis of a reference synchronizing signal and then converted again from digital to analog through a digital-to-analog converter 3. The converted analog signal are outputted as a time base corrected video output signal $VD_{IN2}$.

In writing the reproduced video signal $VD_{IN1}$ into the memory unit 2, the write clock signal CKW is generated by a write clock generator 4 in response to burst signals included in the reproduced video signal $VD_{IN1}$, and then applied to both the analog-to-digital converter 1 and the memory unit 2. Further, a reproduced synchronizing signal PBSYNC including two reproduced horizontal and vertical synchronizing signals PBH and PBV are separated and extracted from the reproduced video signal $VD_{IN1}$ by a synchronizing signal separator 5 and then given to an address generator 6. In response to these two synchronizing signals PBH and PBV, this address generator 6 outputs a write address designation signal ADW representative of the first address for each scanning line to the memory unit 2. Therefore, video data corresponding to each scanning line are written into the memory unit 2 in sequence in response to the write clock signal CKW beginning from a memory area having an address designated by the write address designation signal ADW.

On the other hand, in reading the stored data from the memroy unit 2, a read clock signal CKR is generated by a read clock generator 7 in response to a reference synchronizing signal REFSYNC including two reference horizontal and vertical synchronizing signals REFH and REFV both having stable periods respectively, and then applied to both the memory unit 2 and the digital-to-analog converter 3. Additionally, the reference synchronizing signal REFSYNC is given to the read address generator 6 in order to read the video data stored in the memory unit 2 being classified according to each scanning line by designating the first address in response to the reference horizontal synchronizing signal REFH.

By the way, in order to read video data classified according to each field from the memory unit 2 in the time base corrector as described above, it is necessary to adopt the so-called vertical synchronization method, in which video data are read in response to the vertical synchronizing signal representative of each video signal segment for each field (a picture reproduced by one vertical scanning).

In the above vertical synchronization method, conventionally, addresses are latched in the memory unit 2, at which the vertical synchronizing signals PBV included in the reproduced video signal $VD_{IN1}$ are written. By reading the latched data from the addresses in the memory unit 2, the above-mentioned vertical synchronization can be implemented.

In the prior-art vertical synchronization method, however, there exists a problem in that in writing the vertical synchronizing signal PBV in the memory unit 2, the video signal stored at the first address of the memory unit 2 is sometimes omitted or dropped off during a data writing operation, in particular, in a video tape recorder in which the last of the vertical synchronizing signals PBV included in the reproduced video signal $VD_{IN1}$ is stored as an effective data.

In more detail, with reference to FIG. 3(A), the assumption is made that a video signal for the first scanning line is written at address No. 40 of the memory unit 2, and address No. 39 is latched as the read-start address within the address generator 6 in writing the vertical synchronizing signal PBV at address No. 39. In this case, in practice, it is possible to implement the vertical synchronization in such a way that video data stored in the memory unit 2 are read beginning from the data at address No. 40 in which a video signal for the first scanning line is stored, because the address generator 6 generates the read address signal ADR to the memory unit 2 when the read address reaches address NO. 39.

By the way, in video tape recorders of the helical recording type, there exists one example in which the vertical synchronization is made by latching the vertical synchronizing signal PBV immediately prior to the first video signal as shown in FIG. 3(A). In such a video tape recorder as described above, the vertical synchronizing signal PBV is recorded in both the scanning start segment and the scanning end segment of each helical recording track, and when either one of the two recorded vertical synchronizing signals is omitted or dropped out in variable speed reproducing mode, the vertical synchronization is implemented on the basis of the other remaining vertical synchronizing signal PBV.

In the case thus constructed, a data processing time interval is necessary for writing the vertical synchronizing signal PBN in the memory unit 2 and for simultaneously latching the corresponding address in the address counter 6. Therefore, there exists a problem in that the latch timing is delayed. In case this delay time becomes equal to or beyond the one horizontal segment, the timing of latch at which the read-start address is determined is delayed from address No. 39 to address No. 41, for instance, as shown by the arrow $X_1$ in FIG. 3(A), thus the read-start address being shifted to the area at which video signal is stored. FIG. 3(A) illustrates the case when address No. 41, at which the second scanning line data is stored, is latched, in spite of the fact that the read-start address No. 39 should be latched. Therefore, when read out, video data are read in sequence beginning from the address No. 42 as shown in FIG. 3(B). Therefore, it is impossible to read the video signals corresponding to the first and second scanning lines, which are stored at address No. 40 and address No. 41. Therefore, these data are omitted or dropped off.

In case the latch timing is delayed and therefore the read-start address is shifted to an address at which a video signal should be stored, a part of the video data is omitted during time base correcting processing, resulting in deterioration in reproducing performance of video signals.

In view of the above description, reference is now made to an embodiment of the time base corrector according to the present invention. The gist of the present invention is how to configure the address generator 6 included in the time base corrector as shown in FIG. 1. The address generator 6 according to the present invention is shown in further detail in FIG. 2.

The reproduced synchronizing signal PBSYNC (PBH and PBV) generated from the synchronizing signal separator 5 is applied to a horizontal synchronizing signal oscillator 11 shown in FIG. 2. The horizontal synchronizing signal oscillator 11 is an AFC (automatic frequency control) circuit of PLL type (phase locked loop), for instance, that generates a horizontal pulse output $S_1$ the period of which varies whenever the reproduced horizontal synchronizing signal PBH is skewed. In case there exists a drop out in the reproduced horizontal synchronizing signal PBH, the horizontal synchronizing signal oscillator 11 interpolates the drop out and generates a continuous horizontal synchronizing signal output $S_1$.

The horizontal signal output $S_1$ is counted by a write address counter 12. By this, a write address designation signal ADW, sequentially incremented in response to each pulse of the horizontal synchronizing signal $S_1$, is obtained at the output terminal of the write address counter 12. This signal is applied to the memory unit 2 (shown in FIG. 1) and simultaneously to the address latch circuit 13.

Further, a reproduced vertical synchronizing signal PBV included in the reproduced synchronizing signal PBSYNC is separated by a reproduced vertical synchronizing signal separator 14, the separated signal PBV being given to an address latch circuit 13 as a latch signal $S_2$. Therefore, at the timing that the latch signal $S_2$ is given, the value of the write address designation signal ADW is latched by the address latch circuit 13.

The latched data in the address latch circuit 13 is subtracted by a predetermined number of addresses in the address subtracter 15, the subtracted result LATS being supplied to a read address counter 16 as a load data.

To the read address counter 16, the reference horizontal synchronizing signal REFH is inputted as a count pulse and simultaneously the reference vertical synchronizing signal REFV is given as a data loading signal through a delay circuit 17 to which the reference horizontal synchronizing signal REFH is also inputted as a clock signal.

Therefore, when the reference vertical synchronizing signal REFV is supplied through the delay circuit 17, the read address counter 16 loads the value of the subtraction output LATS of the address subtractor 15. Thereafter, by sequentially counting the reference horizontal synchronizing signal REFH, it is possible to obtain a read address designation signal ADR sequentially incremented beginning from the loaded address LATS, whenever each pulse of the reference horizontal synchronizing signal REFH is given to the read address counter 16, the signal ADR being applied to the memory unit 2 (shown in FIG. 1).

In the circuit configuration in FIG. 2 as described with reference to FIG. 3(A), when the write address designation signal ADW designates address No. 39, a latch signal $S_2$ is supplied from the reproduced vertical synchronizing signal separator 14 to the address latch circuit 13. However, if the address latch circuit 13 requires a time interval corresponding to two segments 2H, for instance, in order to latch the write designation address signal ADW, address No. 41 is latched in the address latch circuit 13 as shown by the arrow $X_1$ in FIG. 3(A).

This latch output signal LAT is subtracted by a predetermined number through an address subtracter 15. In the case of this embodiment, the predetermined subtracter number is selected as "4". Therefore, the value of the subtraction output LATS is address No. 37 as shown in FIG. 3(C), this value being supplied to the read address counter 16 as a load signal. Therefore, the read address counter 16 loads the subtraction output LATS when the reference vertical synchronizing signal REFV is given thereto through the delay circuit 17, and outputs a read address signal ADR to increment the address one by one beginning from the loaded address No. 37 in response to the pulse of the reference horizontal synchronizing signal REFH.

In accordance with the above operation, whenever the latch signal $S_2$ is outputted from the reproduced vertical synchronizing signal separator 14 to the address latch circuit 13 on the basis of the reproduced vertical synchronizing signal PBV, the address No. 41 is latched by the address latch circuit 13. The latched address No. 41 is subtracted by 4; the subtracted address No. 37 is loaded in the read address counter 16 as a load signal. Therefore, data for a new vertical segment (a new field) are read from the memory unit 2 beginning from the address No. 37 prior to the address No. 40 at which video signal for the first scanning line is written. Accordingly, even if it is necessary to take a latch time longer than the period segment of the horizontal synchronizing signal PBH in order to implement the latch operation in the address latch circuit 13, it is possible to prevent in advance the video signal from being dropped out due to the latch time.

The structrual features and functional effects of the elements or sections shown in FIG. 1 other than the address generator described with reference to FIG. 2 are substantially the same as with the prior-art time base corrector previously described and any detailed description of them is believed to be unnecessary.

As described above, in a time base corrector according to the present invention in which the vertical synchronization can be implemented by utilizing the memory address as read-start address base on the basis of the reproduced vertical synchronizing signal, since the read address is loaded by subtracting a predetermined number of addresses from the write address, it is possible to shift the read start address so that video signals are not dropped off, thus it is possible to readily obtain a time base corrector by which video data stored in the memory unit can be securely read without producing any drop-out of video signals.

What is claimed is:

1. A time base corrector for correcting time base fluctuations in a reproduced video signal comprising:
   address generator means;
   means for storing the reproduced video signal in response to a write address designation signal generated by said address generator means in response to a horizontal synchronizing signal in said reproduced video signal;

means for latching the write address designation signal in synchronization with a vertical synchronizing signal in said reproduced video signal;

means for loading the latched address designation signal as a read-start address designation signal in synchronization with a reference vertical synchronizing signal; and means for reading the stored reproduced video signal from said means for storing beginning from a read-start address designated by the read-start address designation signal, in which said address generator means includes:

(a) means for subtracting a predetermined number of addresses from the number of the address designated by the latched address designation signal; and (b) means for applying the resultant subtracted number of the address as a read-start address to said stored reproduced video signal reading means.

2. The time base corrector as set forth in claim 1, wherein the predetermined number of addresses subtracted by said means for subtracting is 4.

3. An apparatus for generating address designation signals to control write-read operations of a memory by which a reproduced video signal is written in or read out in response to a write address designation signal that includes the time base fluctuations substantially the same as in the reproduced video signal and in response to a read address designation signal that has no time base fluctuations, respectively, so as to eliminate time base fluctuations included in the reproduced video signal, which apparatus comprises:

(a) means for latching the write address designation signal in synchronization with a vertical synchronization signal separated from the reproduced video signal;

(b) means for subtracting a predetermined number of addresses from the address number corresponding to the write address designation signal latched in said means for latching; and (c) means for applying a subtracted address number from said means for subtracting as a read-start address signal in synchronization with a reference vertical synchronizing signal.

4. A time base corrector for correcting time base fluctuations in a reproduced video signal which comprises:

(a) a write clock generator for generating a write clock signal including time base fluctuations present in the reproduced video signal;

(b) a memory unit for storing the reproduced video signal in response to the write clock signal from said write clock generator;

(c) a synchronizing signal separator for separating a horizontal synchronizing signal and a vertical synchronizing signal from the reproduced video signal;

(d) a read clock generator for generating a read clock signal having no time base fluctuations in response to a reference synchronizing signal including reference horizontal and vertical synchronizing signals; and (c) an address generator for generating a write address designation signal and a read address designation signal fed to said memory unit including:

(1) means for sequentially incrementing a write address designation signal in response to the horizontal synchronizing signal in said reproduced video signal;

(2) means for latching the incremented write address designation signal in response to the vertical synchronizing signal in said reproduced video signal;

(3) means for subtracting a predetermined number of addresses from the address corresponding to the latched write address designation signal in said means for latching; and (4) means for loading the resultant subtracted number of the address from said means for subtracting in response to a reference vertical synchronizing signal and for sequentially incrementing the loaded number of the address in response to a reference horizontal synchronizing signal to output the read address designation signal to said memory unit.

* * * * *